United States Patent
Hovet et al.

(10) Patent No.: US 6,609,463 B2
(45) Date of Patent: Aug. 26, 2003

(54) FIRING DEVICE FOR A PYROTECHNIC VEHICLE-OCCUPANT PROTECTION DEVICE

(75) Inventors: Kevin Hovet, Maple Plain, MN (US); Peter Popp, München (DE); Christian Zelger, Regensburg (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/122,629

(22) Filed: Apr. 15, 2002

(65) Prior Publication Data

US 2002/0135381 A1 Sep. 26, 2002

Related U.S. Application Data

(63) Continuation of application No. PCT/DE00/03622, filed on Oct. 13, 2000.

(30) Foreign Application Priority Data

Oct. 15, 1999 (DE) .......................... 199 49 842

(51) Int. Cl.$^7$ .............. F42B 3/10; F42B 3/12; F42C 11/00; F42C 19/12; F42C 21/00; F23Q 7/02; F23Q 21/00
(52) U.S. Cl. ............... 102/218; 102/202.5; 102/202.9; 102/206
(58) Field of Search ........................ 102/202.5, 202.9, 102/206, 218

(56) References Cited

U.S. PATENT DOCUMENTS

| 2,869,364 | A | * | 1/1959 | Kabik et al. .................. 73/167 |
| 2,976,485 | A | * | 3/1961 | Bartz .......................... 324/502 |
| 3,675,578 | A | * | 7/1972 | Douglas et al. ............. 102/70.2 |
| 4,869,170 | A | * | 9/1989 | Dahmberg et al. ....... 102/202.5 |
| 5,135,254 | A | | 8/1992 | Masegi et al. .............. 280/735 |
| 5,621,184 | A | * | 4/1997 | Gwynn, III ................. 102/215 |
| 5,756,926 | A | * | 5/1998 | Bonbrake et al. ........... 102/215 |
| 5,964,816 | A | | 10/1999 | Kincaid ....................... 701/45 |
| 6,470,803 | B1 | * | 10/2002 | Liu et al. ..................... 102/206 |

FOREIGN PATENT DOCUMENTS

| DE | 195 39 070 A1 | * | 4/1997 |
| EP | 0 471 871 B1 | * | 2/1992 |
| EP | 0 805 074 A1 | | 11/1997 |
| EP | 0 836 967 A2 | | 4/1998 |
| EP | 0 836 967 A3 | | 9/2000 |

* cited by examiner

*Primary Examiner*—Michael J. Carone
*Assistant Examiner*—Henry A. Blackner
(74) *Attorney, Agent, or Firm*—Laurence A. Greenberg; Werner H. Stemer; Ralph E. Locher

(57) ABSTRACT

A firing device is described and has an electronic unit which is connected upstream of a firing cap and generates a constant firing voltage. A bypass line is provided for bypassing the electronic unit. A test switching device can be actuated by a test signal and, when a test signal is present, connects a line, which conducts a supply voltage, to the bypass line. In this way, a Brouston test can be carried out.

3 Claims, 1 Drawing Sheet

FIRING DEVICE FOR A PYROTECHNIC VEHICLE-OCCUPANT PROTECTION DEVICE

CROSS-REFERENCE TO RELATED APPLICATION

This application is a continuation of International Application PCT/DE00/03622, filed Oct. 13, 2000, which designated the United States.

BACKGROUND OF THE INVENTION

Field of the Invention

The invention relates to a firing device for a pyrotechnic vehicle-occupant protection device, in particular for motor vehicles. The firing device contains a terminal for an external supply line, an electronic unit with a voltage input and a control input that are connected to the terminal, a voltage output, and a firing output. A firing component is connected to the voltage output and to a firing switch that is connected to the firing output. The electronic unit generates a predetermined firing voltage at its voltage output when a supply voltage is applied to its voltage input, and when a firing signal is applied to its control input, generates a firing pulse at its firing output. The firing pulse actuates the firing switch with the result that the firing component fires.

Conventional firing devices for pyrotechnic vehicle-occupant protection devices, for example firing caps for gas generators of airbags or belt pretensioning devices are subjected to what is referred to as a "Brouston" test for quality assurance. In the test, a number of firing caps are extracted from a batch. A first voltage is then applied to a first firing cap. If the firing cap does not yet fire at the first voltage, the voltage is increased until firing occurs. After the firing of the firing cap, the voltage at which the first firing cap has fired is lowered again somewhat on a second firing cap. If the second firing cap does not fire, the voltage is slightly increased again until the firing cap fires, and so on. As a result, a firing distribution over firing voltages is obtained. The advantage of the initial Brouston test is that relatively reliable statistical data can be acquired with relatively few triggered and fired firing caps. The reason for the reliability of this data is that the voltage always fluctuates around the firing voltage.

Conventional firing caps have two terminals or terminal pins between which a firing bridge, for example a wire fuse is located. The firing voltage is applied to the terminals.

In modern firing devices that are actuated by a firing bus, an electronic unit, which generates a well defined and stabilized voltage and permits energy to be supplied to the firing cap only if a coded firing signal is detected at the terminal is connected between the cable-harness-end terminal, or the cable-harness end terminal pins, and the firing cap. This ensures a high degree of operational reliability. However, the intermediately connected electronic unit makes the Brouston test impossible. In such modern firing caps and firing devices there are no accessible connecting points between the electronic unit and the firing bridge.

SUMMARY OF THE INVENTION

It is accordingly an object of the invention to provide a firing device for a pyrotechnic vehicle-occupant protection device which overcomes the above-mentioned disadvantages of the prior art devices of this general type, in which there is a large degree of flexibility with respect to flexibility.

With the foregoing and other objects in view there is provided, in accordance with the invention, a firing device for a pyrotechnic vehicle-occupant protection device. The firing device contains a terminal for an external supply line and an electronic unit having a voltage input coupled to the terminal, a control input connected to the terminal, a voltage output, a firing output, and a test output. A firing switch is connected to the firing output. A firing component is connected to the voltage output and to the firing switch. A test switching device is connected between the terminal and the voltage input. The test switching device is connected to the test output of the electronic unit. A bypass line is connected between the test switching device and the voltage output. The test switching device disconnects a connection between the terminal and the voltage input and connects the terminal to the bypass line when a test signal is applied to the control input of the electronic unit. The electronic unit generates a predetermined firing voltage available at the voltage output when a supply voltage is applied to the voltage input, and when a firing signal is applied to the control input, the electronic unit generates a firing pulse available at the firing output. The firing pulse actuates the firing switch with a result that the firing component fires.

By using the switching device provided according to the invention it is possible to bypass the electronic unit and to test the firing device directly in a conventional way by applying an appropriate supply voltage or test voltage.

In accordance with an added feature of the invention, a charging resistor is connected in the bypass line for limiting a current flowing through the bypass line to a value at which the firing component does not fire.

In accordance with a further feature of the invention, the test switching device contains a MOSFET.

Other features which are considered as characteristic for the invention are set forth in the appended claims.

Although the invention is illustrated and described herein as embodied in a firing device for a pyrotechnic vehicle-occupant protection device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
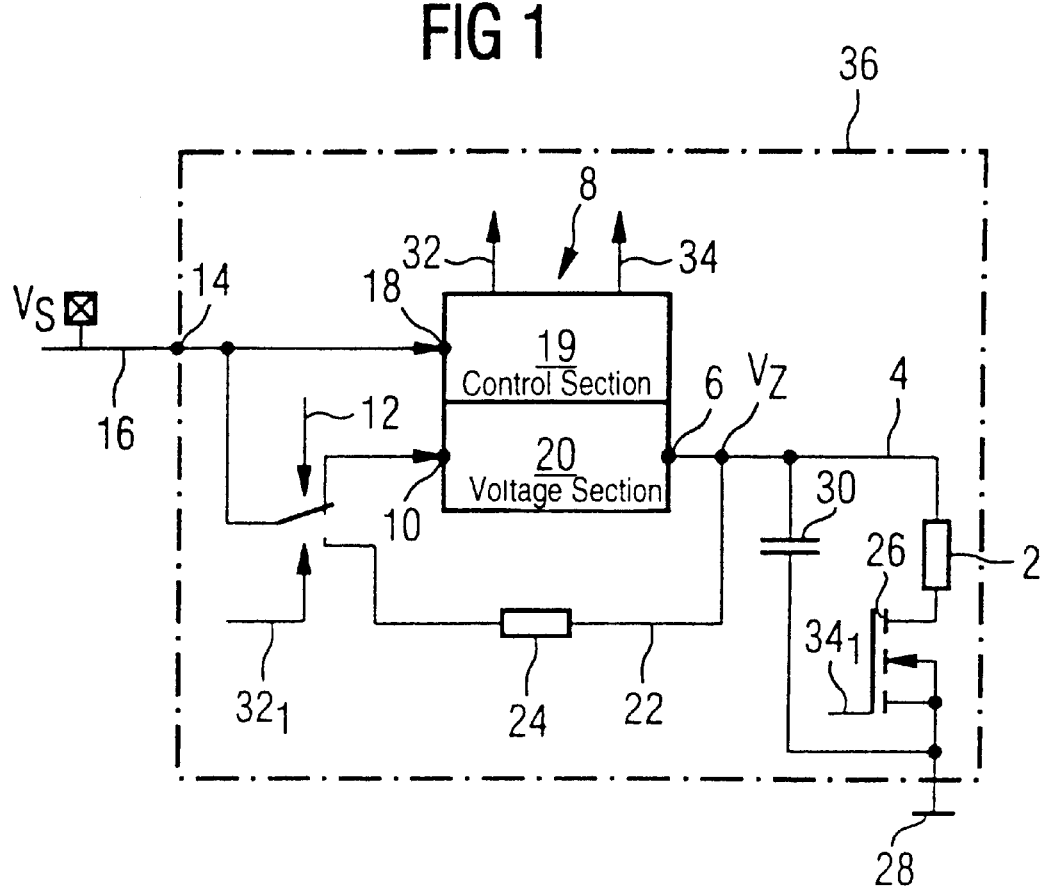
FIG. 1 is a block circuit diagram of a firing device according to the invention.

Referring now to the figures of the drawing in detail and first, particularly, to FIG. 1 thereof, there is shown a terminal of a firing cap 2 that is connected to a voltage output 6 of an electronic unit 8 via a line 4. A voltage input 10 of the electronic unit 8 is connected via a test switching device 12 to a terminal 14 to which an external supply line 16, for example a firing bus of the vehicle electric system, is connected. The terminal 14 is also connected to a control input 18 of the electronic unit 8 that has a control section 19 with a voltage section 20.

A bypass line 22 with a charging resistor 24 leads from the test switching device 12 to the voltage output 6 parallel to the electronic unit 8.

The firing cap 2 is connected via a firing switch 26 to a further terminal 28 of the firing device, which further terminal 28 can be connected, for example, to ground and to a corresponding conductor of the supply line 16.

A charging capacitor 30 is located parallel to the firing cap 2 and to the firing switch 26.

The electronic unit 8 has two control outputs 32 and 34 that are connected to corresponding control inputs $32_1$ and $34_1$ of the test switching device 12 or of the firing switch 26.

A housing 36 within which the entire firing device is accommodated is shown by dashed lines, only the terminals 14 and 28 being accessible from the outside. It goes without saying that the degree of circuit integration may vary, for example the switches 12 and 26 and the bypass line 22 may be integrated into the electronic unit 8.

The individual components or elements are known per se in terms of their configuration and their function so that only their interaction is explained below. It is assumed that there is a voltage, for example an alternating voltage with constant frequency, on the supply line 16. The test switching device 12 is in the position illustrated in which the terminal 14 is connected to the voltage section 20. A predetermined, constant firing voltage $V_Z$ to which the charging capacitor 30 is charged is generated in the voltage section 20 from the supply voltage $V_S$ of the supply line 16.

If a firing signal that is coded in a predetermined fashion is then supplied via the supply line 16, the firing signal is detected in the control section 19 of the electronic unit 8 and the control section 19 generates, at the control output 34, a firing pulse which switches the firing switch 26 to the conductive position. The charging capacitor 30 discharges through the firing cap 2 and the firing switch 26, as a result of which the firing cap 2 fires.

If a predetermined, coded test signal is present on the supply line 16, this is detected by the control section 19 of the electronic unit 8 and a test pulse which is fed to the control input $32_1$ of the test switching device 12 is generated at the control output 32. The test switching device 12 then switches over so that the voltage input 10 is disconnected from the terminal 14, and the supply line 16 is connected to the bypass line 22. In this way, the supply voltage $V_S$ on the supply line 16 is fed directly to the charging capacitor 30 so that the voltage section 20 is deactivated and the voltage $V_Z$ at the voltage output 6 is equal to the supply voltage $V_S$. The charging resistor 24 ensures that the charging current is limited so that the firing cap 2 cannot fire even when there is a defect in the firing switch 26.

If the charging capacitor 30 is charged in each case to the supply voltage $V_S$, the firing switch 26 can, as described above, be switched to the conductive position by a firing signal of the supply line 16 and a firing pulse which subsequently appears at the control output 34, with the result that, as in the case of the Brouson test described at the beginning, it is possible to test whether the firing cap 2 fires at the respective supply voltage.

Figure 2:
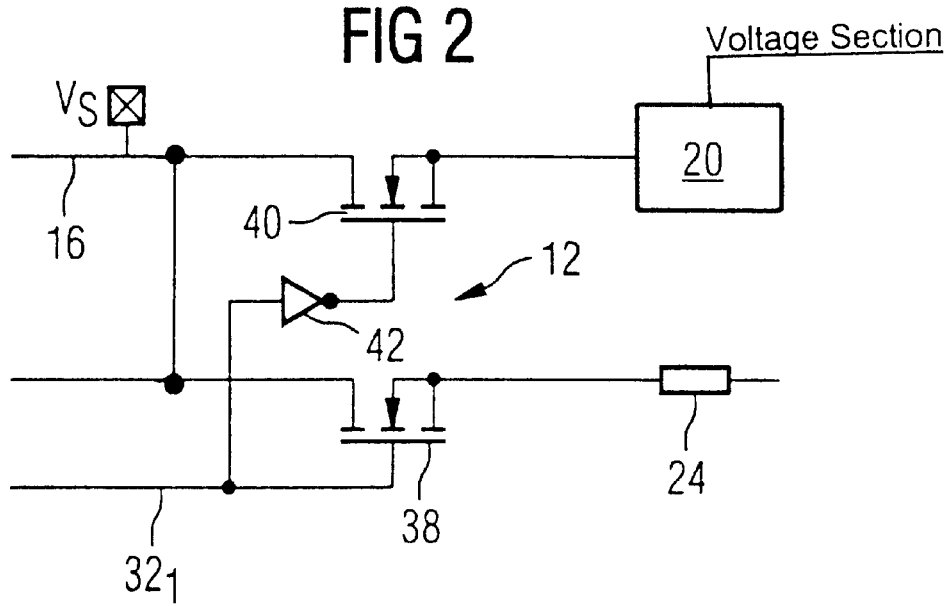
FIG. 2 is a block circuit diagram of a test switching device.

The test switching device 12 can be formed by any suitable components or switching elements. FIG. 2 shows such an example.

The supply line 16 is connected via a first switch 38, for example a MOSFET (Metal-Oxide Semiconductor Field Effect Transistor), to the charging resistor 24 and to the voltage section 20 via a second switch 40, which is also embodied, for example, as a MOSFET. The control input $32_1$ is connected directly to the switch 38 in order to actuate it, and to the switch 40 via an inverter 42 in order to actuate the switch 40. Depending on the polarity of the voltage at the control input $32_1$, the switch 38 connects the supply line 16 to the charging resistor 24 and the switch 40 disconnects, or the switch 40 connects the supply line 16 to the voltage section 20 and the switch 38 disconnects.

Of course, the firing device described can be modified in various ways. For example, it is possible to provide, in addition to the firing switch 26, a saving switch which must be activated in addition to the firing switch 26 in the sense of a logic AND switching operation so that the charging capacitor 30 can discharge through the firing cap 2. The supply line 16 may have a different configuration, for example may contain one conductor that conducts the supply voltage and another conductor that conducts the control signals. In this case, the control input 18 is connected to the control section, and the input of the test switching device 12 is connected to the voltage section.

We claim:

1. A firing device for a pyrotechnic vehicle-occupant protection device, comprising:

a terminal for an external supply line;

an electronic unit having a voltage input coupled to said terminal, a control input connected to said terminal, a voltage output, a firing output, and a test output;

a firing switch connected to said firing output;

a firing component connected to said voltage output and to said firing switch;

a test switching device connected between said terminal and said voltage input, said test switching device connected to said test output of said electronic unit; and a bypass line connected between said test switching device and said voltage output, said test switching device disconnecting a connection between said terminal and said voltage input and connecting said terminal to said bypass line when a test signal is applied to said control input of said electronic unit;

said electronic unit generating a predetermined firing voltage available at said voltage output when a supply voltage is applied to said voltage input, and when a firing signal is applied to said control input, said electronic unit generates a firing pulse available at said firing output, the firing pulse actuates said firing switch with a result that said firing component fires.

2. The firing device according to claim 1, further comprising a charging resistor connected in said bypass line for limiting a current flowing through said bypass line to a value at which said firing component does not fire.

3. The firing device according to claim 1, wherein said test switching device contains a Metal-Oxide semiconductor Field Effect Transistor.

* * * * *